United States Patent [19]

Tokura et al.

[11] Patent Number: 4,654,751
[45] Date of Patent: Mar. 31, 1987

[54] HIGH-TENSION CAPACITOR

[75] Inventors: Koichi Tokura, Amagasaki; Masazumi Tayake, Sanda, both of Japan

[73] Assignee: Risho Kogyo Co., Ltd., Osaka, Japan

[21] Appl. No.: 755,144

[22] Filed: Jul. 15, 1985

[30] Foreign Application Priority Data

Mar. 22, 1985 [JP] Japan .................. 60-059228

[51] Int. Cl.⁴ .............. H01G 4/38; H01G 4/08
[52] U.S. Cl. .................... 361/328; 361/323
[58] Field of Search ............. 361/323, 328, 311–315, 361/324, 433 W, 433 J

[56] References Cited

U.S. PATENT DOCUMENTS

| | | | |
|---|---|---|---|
| 1,511,935 | 10/1924 | Bayles et al. | 361/433 W X |
| 1,610,980 | 12/1926 | Silberman | 361/328 |
| 1,658,501 | 2/1928 | Valle | 361/328 |
| 2,484,215 | 10/1949 | Foster | 361/323 X |
| 2,935,668 | 5/1960 | Robinson et al. | 361/314 X |
| 3,363,156 | 1/1968 | Cox | 361/314 X |
| 3,377,530 | 4/1968 | Meyers | 361/328 X |
| 3,831,070 | 8/1974 | Bouille et al. | 361/323 X |
| 4,161,774 | 7/1979 | Behn | 361/323 X |
| 4,480,286 | 10/1984 | Whitman et al. | 361/314 |

FOREIGN PATENT DOCUMENTS

| | | | |
|---|---|---|---|
| 2624724 | 12/1977 | Fed. Rep. of Germany | 361/328 |
| 384617 | 12/1932 | United Kingdom | 361/433 J |
| 1055362 | 1/1967 | United Kingdom | 361/433 W |

*Primary Examiner*—Donald A. Griffin
*Attorney, Agent, or Firm*—Wenderoth, Lind & Ponack

[57] ABSTRACT

A high-tension capacitor including alternating dielectric layers and electrode layers, the dielectric layers having a synthetic resin film between a layer of highly impregnable and porous material. The capacitor elements having the alternating electrode layers and dielectric layers are surrounded by a highly impregnable electrically insulating material and the assembly is impregnated with a synthetic resin which penetrates the porous layers of the dielectric layers and the insulating material surrounding the capacitor elements. Alternatively, the capacitor elements are impregnated with a resin having a good impregnability and low viscosity and the insulation layer molded around the impregnated capacitor elements can be impregnated with a resin having good strength and high viscosity. A relaxation layer may also be interposed at regular intervals between the electrode layers and dielectric layers for absorbing the shrinking force upon hardening of the synthetic resin.

20 Claims, 10 Drawing Figures

HIGH-TENSION CAPACITOR

The present invention relates to a high-tension capacitor.

Conventional high-tension capacitors have so far been manufactured in the manner described below with reference to FIG. 1. Firstly, capacitor elements A are formed by overlapping alternately electrode layers and dielectric layers made from insulating paper or plastic film and rolling the laminated sheet. A plurality of such capacitor elements are housed in a steel casing 4 and are electrically connected to one another and to high-tension bushings on terminals 7 through lead wires 6. Finally they are vacuum-impregnated with a high-tension insulating oil 8 and are sealed.

In such high-tension capacitors, the dielectric layers must have a high degree of insulation property because it greatly affects the life of the capacitor. In conventional high-tension capacitors, the dielectric layers are impregnated with a high-tension insulating oil to form insulation layers between the electrode layers. However, even with such a measure, they were not completely free from insulation breakdown or abnormal temperature rise.

Should such a trouble occur, the temperature of the capacitor itself rises to an abnormal level and the capacitor elements and the insulating oil expand by heat. This can induce breakage or explosion of the steel casing and environmental pollution with splashed insulating oil. Further, fire can be induced since an insulating oil is a combustible liquid with a flashing point between 130° and 200° C.

Should a fire break out at a crowded place such as high-rise buildings, underground streets, hospitals, and schools, the lives of a great number of people may be lost. Therefore, non-combustible and exlosion-proof properties are required for such electrical equipment. An oil free arrangement has been provided for all electrical equipment except for high-tension capacitors.

In view of the above, the applicant of the present invention proposed in Japanese Patent Application No. 59-3993 a high-tension capacitor comprising capacitor elements having dielectrics disposed between the electrode layers and impregnated with synthetic resin, the capacitor elements being housed in a sealed container molded of synthetic resin, and sulfur hexafluoride gas ($SF_6$) being filled into the container as an insulator. Even with such a capacitor, gas pressure might increase and the explosion of the container could be induced, if a protective device should fail to prevent the capacitor from heating up to an abnormal level.

It is an object of the present invention to provide a high-tension capacitor which can be manufactured easily and which is free from the hazard of fire and explosion.

In accordance with the present invention, no gas or liquid is used as an insulating medium. Instead, not only the dielectric layers in the capacitor elements are impregnated with synthetic resin to increase the insulation strength, but also the capacitor elements are insulated with synthetic resin by having their outer periphery molded of synthetic resin. This provides high-tension capacitors without the potential for fire or explosion due to insulation failure.

Further, in accordance with the present invention, relaxation layers made of an elastic material are provided at regular radial spacings in each capacitor element to prevent cracking of the dielectric layers and the peeling at the boundary between the electrode layers and the dielectric layers.

According to the present invention, without using any liquid or gaseous insulating material, high-quality, explosion-proof, non-inflammable high-tension capacitors are provided.

Other objects and features of the present invention will become apparent from the following description taken with reference to the accompanying drawings, in which.

Figure 5:
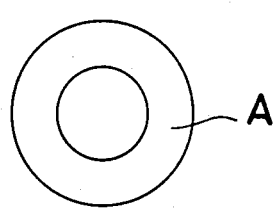
FIGS. 5–8 are plan views of examples of capacitor elements.
Figure 6:
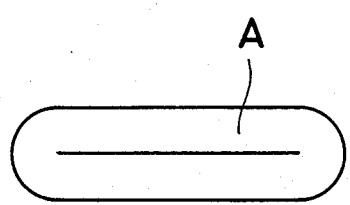
Figure 9:
FIG. 9 is a sectional view of the dielectric layer.
Figure 10:
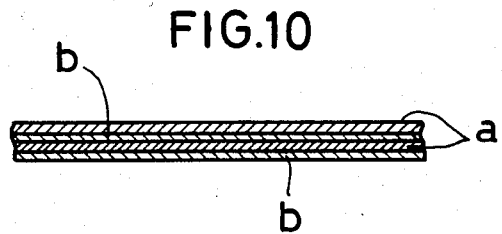
FIG. 10 is a sectional view of the capacitor element not rolled.

Referring now to the drawings, FIG. 9 shows a dielectric layer a which comprises a layer of highly impregnable and porous electrically insulating material 2 such as non-woven or woven cloth attached to both sides of a film 1 of synthetic resin such as polyester or polypropylene. The capacitor elements A shown in FIGS. 5 and 6 are made by overlapping the dielectric layers a and the electrode layers b alternately as shown in FIG. 10 and rolling the laminate.

Figure 1:
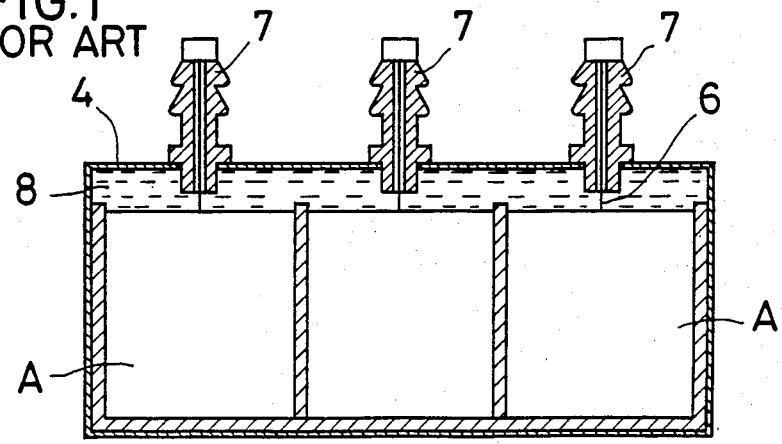
FIG. 1 is a sectional view of a conventional high-tension capacitor.
Figure 2:
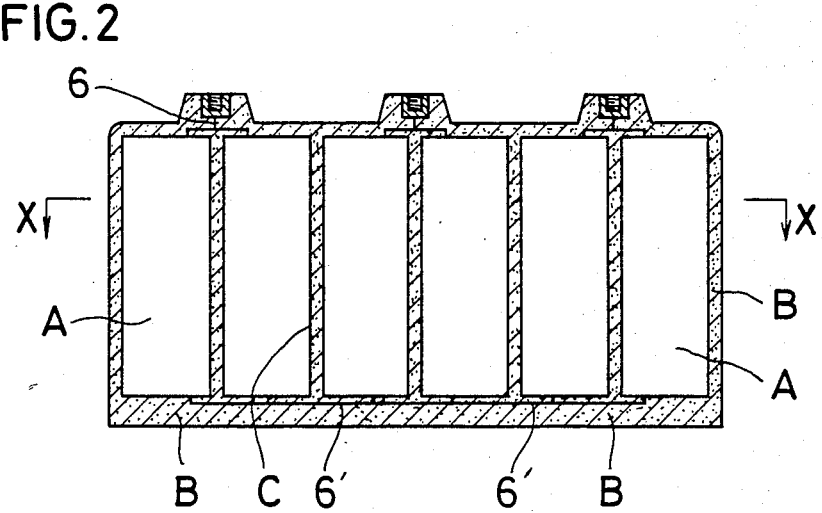
FIG. 2 is a sectional view of a high-tension capacitor embodying the present invention.
Figure 3:
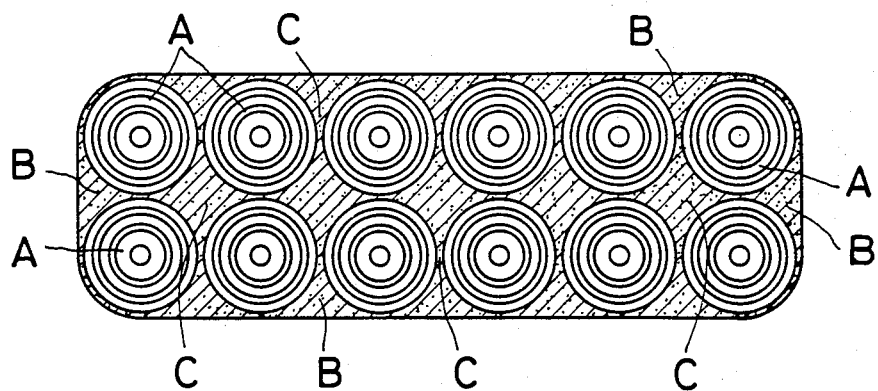
FIG. 3 is a horizontal sectional view taken along the line X—X of FIG. 2.
Figure 4:
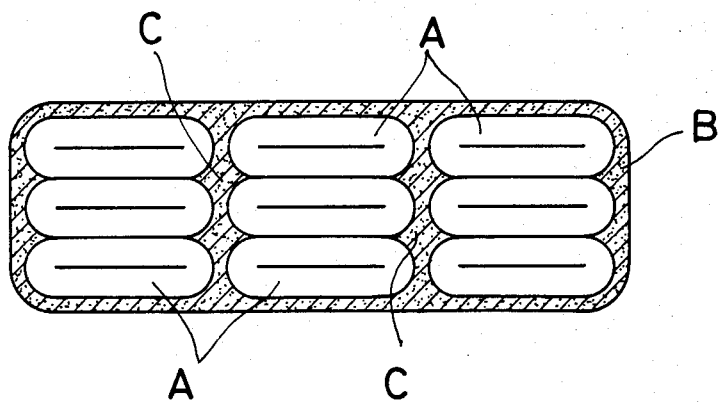
FIG. 4 is a view similar to FIG. 3 of another embodiment.

A plurality of the capacitor elements A are formed from the laminate and arranged along wiring 6' electrically connecting the capacitor elements A together, as shown in FIG. 2. The gap C and the periphery B between and around the capacitor elements A are filled with a highly impregnable electrically insulating material such as glass tape, glass cloth, glass mat, glass chop, non-woven cloth or paper to form a housing having a predetermined peripheral shape. The assembly of capacitor elements is then put into a metal die as shown in FIG. 1 and is subjected to heat drying and vacuum drying and then to impregnation with a synthetic resin such as epoxy resin under high vacuum. The porous part of the dielectric layers a and the insulating material are impregnated with the same resin at the same time to form the outer case of the high-tension capacitor. For better impregnation, the temperature of synthetic resin should be kept at 100° C. and its viscosity be lowered to about 20 cp, and a high vacuum should be maintained for over three hours. This ensures that the dielectric layers a have good insulation. Further, the thus formed high-tension capacitor having the outer covering molded of synthetic resin together with the capacitor elements is removed from the metal die.

Although in the preferred embodiment the impregnation of the capacitor elements and the formation of the insulating layer around the capacitor elements are performed at the same time, the capacitor elements may be impregnated and mounted in a metal mold, and an insulation layer may be formed around the capacitor elements. This method has the advantage of using different synthetic resins as the coating, such as, a resin having a good impregnability and low viscosity for impregnating the capacitor elements, and a resin having a good strength and high viscosity for the insulating layer.

Figure 7:
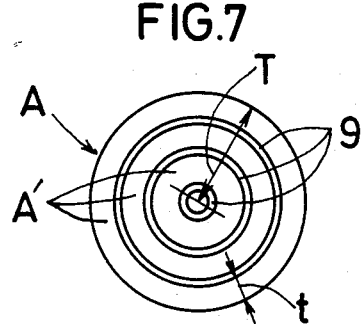
Figure 8:
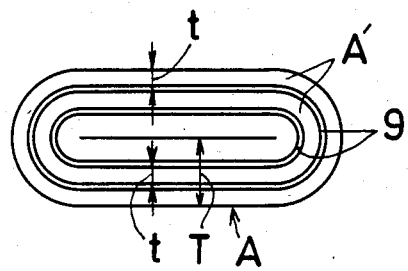

In forming a capacitor element A by overlapping the electrode layers b and the dielectric layers a, as shown in FIGS. 7 and 8, relaxation layers 9 made of an elastic material such as Hycar cork, cork sponge and press board should be interposed at regular intervals t. The layers between the relaxation layers 9 are electrically connected in parallel with each other. The relaxation layers absorb the shrinking force upon hardening of the synthetic resin, preventing the cracking of the dielectric layers and the peeling at the boundary between the electrode layer and the dielectric layer and thus precluding the decrease of the insulation stength. The distance t between the relaxation layers 9 may be determined suitably. If the thickness T of the capacitor element is e.g. 50 mm, the distance t should be 10–20 mm for greater workability, though the smaller, the better.

What we claim:

1. A high-tension capacitor comprising:
   a plurality of capacitor elements, each of said capacitor elements having a plurality of rolled alternating dielectric and electrode layers, each of said dielectric layers consisting of a layer of highly impregnable and porous electrically insulating material on either side of a synthetic resin film;
   lead wires electrically connecting said capacitor elements together;
   a housing surrounding said plurality of capacitor elements and lead wires, said housing being a highly impregnable electrically insulating material;
   a synthetic resin impregnated into said dielectric layers and said housing which when hardened forms the outer case of said high-tension capacitor; and
   terminals electrically connected to said capacitor elements and disposed on said housing.

2. The high-tension capacitor of claim 1, further comprising a plurality of relaxation layers for absorbing shrinkage upon hardening of said synthetic resin and for preventing cracking of said dielectric layers and for preventing peeling at the boundaries between said dielectric layers and said electrode layers, each of said relaxation layers being interposed at regular intervals between said dielectric layers and said electrode layers.

3. The high-tension capacitor of claim 2, wherein each of said relaxation layers is a material selected from the group consisting of cork, cork sponge and press board.

4. The high-tension capacitor of claim 2, wherein the thickness of said capacitor elements is 50 mm and the distance between said relaxation layers is 10–20 mm.

5. The high-tension capacitor of claim 1, wherein said highly impregnable electrically insulating material of said housing is one or more materials selected from the group consisting of glass tape, glass cloth, glass mat, glass chop, non-woven cloth or paper.

6. The high-tension capacitor of claim 1, wherein said synthetic resin film is polyester.

7. The high-tension capacitor of claim 1, wherein said synthetic resin film is polypropylene.

8. A high-tension capacitor comprising:
   a plurality of capacitor elements, each of said capacitor elements having a plurality of rolled alternating dielectric and electrode layers, each of said dielectric layers consisting of a layer of highly impregnable and porous electrically insulating material on either side of a synthetic resin film, said highly impregnable and porous electrically insulating material being impregnated with a resin having a low viscosity and good impregnability;
   lead wires electrically connecting said capacitor elements together;
   a housing surrounding said plurality of capacitor elements and lead wires, said housing being a highly impregnable electrically insulating material, said housing being impregnated with a synthetic resin having a good strength and high viscosity to form the outer case of said high-tension capacitor; and
   terminals electrically connected to said capacitor elements and disposed on said housing.

9. The high-tension capacitor of claim 8, further comprising a plurality of relaxation layers for absorbing shrinkage upon hardening of said synthetic resin impregnated into said dielectric layers and for preventing cracking of said dielectric layers and for preventing peeling at the boundaries between said dielectric layers and said electrode layers, each of said relaxation layers being interposed at regular intervals between said dielectric layers and said electrode layers.

10. The high-tension capacitor of claim 9, wherein each of said relaxation layers is a material selected from the group consisting of cork, cork sponge and press board.

11. The high-tension capacitor of claim 8, wherein said highly impregnable electrically insulating material of said housing is one or more materials selected from the group consisting of glass tape, glass cloth, glass mat, glass chop, non-woven cloth or paper.

12. The high-tension capacitor of claim 8, wherein said synthetic resin film is polyester.

13. The high-tension capacitor of claim 8, wherein said synthetic resin film is polypropylene.

14. The high-tension capacitor of claim 8, wherein said impregnating resin is an epoxy resin.

15. A high-tension capacitor comprising:
   a plurality of capacitor elements, each of said capacitor elements having a plurality of rolled alternating dielectric and electrode layers, each of said dielectric layers consisting of a layer of highly impregnable and porous electrically insulating material on either side of a synthetic resin film;
   lead wires electrically connecting said capacitor elements together;
   a housing surrounding said plurality of capacitor elements and lead wires, said housing being a highly impregnable electrically insulating material;
   a synthetic resin impregnated into said dielectric layers and said housing which when hardened forms the outer case of said high-tension capacitor; and
   terminals electrically connected to said capacitor elements and disposed on said housing;
   said capacitor being produced by a process which comprises rolling said dielectric and electrode layers to form a laminate;
   forming said capacitor elements from said laminate;
   arranging said capacitor elements along said lead wires and connecting said terminals to said lead wires;
   forming said housing of highly impregnable electrically insulating material around said capacitor elements and lead wires with said terminals extending from said housing;
   placing said housing in a metal die;
   subjecting said housing in said metal die to heat drying and vacuum drying;

impregnating under a vacuum at least said highly impregnable electrically insulating material of said housing with a synthetic resin;

heating the impregnated housing to harden said synthetic resin; and removing said high-tension capacitor having said impregnated housing as said outer case from said metal die.

16. The high-tension capacitor of claim 15, produced by the further step of impregnating said dielectric layers with synthetic resin prior to forming said housing around said capacitor elements and lead wires.

17. The high-tension capacitor of claim 15, produced by the further step of providing a plurality of relaxation layers interposed at regular intervals between said dielectric and electrode layers for absorbing shrinkage upon hardening of said synthetic resin to thereby prevent cracking of said dielectric layers and prevent peeling of the boundaries between said dielectric layers and said electrode layers, each of said relaxation layers being interposed at regular intervals between said dielectric layers and said electrode layers.

18. The high-tension capacitor of claim 17, wherein said relaxation layers are a material selected from the group consisting of cork, cork sponge and press board.

19. The high-tension capacitor of claim 15, wherein said highly impregnable electrically insulating material of said housing is one or more materials selected from the group consisting of glass tape, glass cloth, glass mat, glass chop, non-woven cloth or paper.

20. The high-tension capacitor of claim 15, wherein said synthetic resin is a material selected from the group consisting of polyester and polypropylene.

* * * * *